US008981898B2

(12) United States Patent
Sims et al.

(10) Patent No.: US 8,981,898 B2
(45) Date of Patent: Mar. 17, 2015

(54) REMOTE CONTROL SYSTEM AND METHOD

(75) Inventors: Michael J. Sims, Zeeland, MI (US); Richard J. Chutorash, Oakland Township, MI (US)

(73) Assignee: Gentex Corporation, Zeeland, MI (US)

( * ) Notice: Subject to any disclaimer, the term of this patent is extended or adjusted under 35 U.S.C. 154(b) by 1299 days.

(21) Appl. No.: 12/519,741

(22) PCT Filed: Dec. 19, 2007

(86) PCT No.: PCT/US2007/088076

§ 371 (c)(1), (2), (4) Date: Jan. 12, 2010

(87) PCT Pub. No.: WO2008/079856

PCT Pub. Date: Jul. 3, 2008

(65) Prior Publication Data

US 2010/0134240 A1 Jun. 3, 2010

Related U.S. Application Data

(60) Provisional application No. 60/876,220, filed on Dec. 21, 2006.

(51) Int. Cl.
*G06F 7/04* (2006.01)
*G08C 17/02* (2006.01)

(52) U.S. Cl.
CPC ............ *G08C 17/02* (2013.01); *G08C 2201/40* (2013.01); *G08C 2201/50* (2013.01)
USPC .......................................... 340/5.71; 340/5.2

(58) Field of Classification Search
USPC .................................................. 340/5.7, 5.71
See application file for complete search history.

(56) References Cited

U.S. PATENT DOCUMENTS 7,142,849 B2 * 11/2006 Neuman ....................... 455/420
7,227,444 B2 * 6/2007 Fitzgibbon .................. 340/5.24
(Continued)

FOREIGN PATENT DOCUMENTS

WO WO 00/12849 A1 3/2000
WO WO 2008/079856 A2 7/2008

OTHER PUBLICATIONS

International Search Report and Written Opinion for International Patent Application No. PCT/US2007/088076, mailed Sep. 12, 2008, 11 pages.

*Primary Examiner* — Brian Zimmerman
*Assistant Examiner* — Sara Samson
(74) *Attorney, Agent, or Firm* — Foley & Lardner LLP; Scott P. Ryan

(57) ABSTRACT

A system for mounting to a vehicle including a user interface element and for controlling a transmitter device configured to send an expected transmission to receiving device is provided. The system includes a transceiver. The system further includes an interface for receiving a first signal from the user interface element. The system yet further includes a processor configured to establish a bi-directional data communication link between the transceiver and the transmitter device. The processor is further configured to cause the transceiver to send a second signal to the transmitter device via the bi-directional data communication link based upon the first signal received at the interface. The processor is yet further configured to format the second signal so that the transmitter device will send the expected transmission to the receiving device.

20 Claims, 10 Drawing Sheets

(56) References Cited

U.S. PATENT DOCUMENTS 7,515,943 B2 * 4/2009 Wada .......................... 455/569.1
7,715,791 B2 * 5/2010 Matsuda ...................... 455/41.2
2005/0024228 A1 * 2/2005 Vignon et al. ........... 340/825.72
2006/0049922 A1 * 3/2006 Kolpasky et al. ........ 340/426.13
2006/0132284 A1 * 6/2006 Murphy et al. ................ 340/5.7

* cited by examiner

REMOTE CONTROL SYSTEM AND METHOD

CROSS REFERENCE TO RELATED APPLICATIONS

The present application claims the benefit of International Application No. PCT/US2007/088076 filed Dec. 19, 2007, which claims the benefit of U.S. Provisional Patent Application No. 60/876,220 filed Dec. 21, 2006, the entire disclosures of which are incorporated by reference herein.

BACKGROUND

The present application relates generally to the field of communication and user control in a motor vehicle. The application relates more specifically to systems and methods for controlling a receiver located external a vehicle.

Electronically operated remote control systems, such as garage door opener systems, home security systems, home lighting systems, gate controllers, etc., typically employ a portable, hand-held transmitter (i.e., an original transmitter) to transmit a control signal to a receiver device. For example, a garage door opener system typically includes a receiver device located within a home owner's garage and coupled to or including garage door opener. A user presses a button on the transmitter to transmit a radio frequency signal to the receiver to activate the garage door opener to open and close a garage door. Accordingly, the receiver is tuned to the frequency of its associated original transmitter and demodulates a predetermined code programmed into both the original transmitter and the receiver for operating the garage door. To enhance security of wireless control systems, such as a garage door opener system, manufacturers commonly use encryption technology to encrypt the data to be transmitted and/or the radio frequency signal sent from a transmitter to a receiver. One such encryption method is a rolling code system, wherein each digital message sent from the transmitter to the receiver has a different code from the previous digital message. Rolling code systems may utilize an encryption scheme to encode some of the data in the payload as well as to use predictably changing data.

As an alternative to a portable, hand-held original transmitter, a universal transceiver (e.g., universal remote control, trainable transceiver, etc.) may be provided in a vehicle for use with remote control systems. A transmitter device is typically configurable by a user to activate one or more receiver devices using different radio frequency messages. A user may train the transmitter device to an existing original transmitter by holding the two transmitters in close range and pressing buttons on the original transmitter and the trainable transmitter. The transmitter device identifies the type of remote control system associated with the original transmitter based on a radio frequency signal received from the original transmitter. For example, the trainable transmitter may identify and store the control code and RF carrier frequency of the original transmitter's radio frequency control signal. In addition, the receiver may learn a transmitter identifier of the trainable transmitter. For systems employing a rolling code (or other encryption method), the trainable transceiver and receiver must also be "synchronized" or further trained so that the counters of the trainable transmitter and the receiver begin at the same value. Accordingly, the user presses a button on the remote control system receiver to put the receiver in a training mode. A button on the trainable transceiver may then be pressed, for example, two to three times, to transmit messages so that the receiver may learn the transmitter identifier, complete synchronization of the receiver and the trainable transmitter and confirm that training was successful. Once trained, the trainable transceiver may be used to transmit RF signals to control the remote control system. Other methods of training may include a "transmit-attempt" type system wherein the transmitter transmits a variety of sequences and the user observed the receiver device to determine the most compatible sequence.

While conventional processes may provide drivers or users with a remote control device that may be conveniently placed inside or onto the vehicle, some users and/or devices have difficulty with a training process or are simply not compatible. Moreover, as security measures become increasingly complicated, universal transmitter are also typically becoming more complicated. This increased complication may lead to increased design, manufacturing, and/or aftermarket costs.

It would further be desirable to provide an in-vehicle control system that may reduce the need for training a transmitter via trial and error and/or capturing a radio signal.

It would be desirable to provide a system and/or method that satisfied one or more of these needs or provides other advantageous features. Other features and advantages will be made apparent from the present specification. The teachings disclosed extend to those embodiments that fall within the scope of the claims, regardless of whether they accomplish one or more of the aforementioned needs. The invention is capable of other embodiments and of being practiced or being carried out in various ways. Alternative exemplary embodiments relate to other features and combinations of features as may be generally recited throughout this description.

SUMMARY

One embodiment relates to a transmitter device for causing a receiver device to change states after the transmitter device receives a signal from a first communication device configured for bi-directional wireless data communications. The receiver device is configured to change states upon receipt of an expected transmission. The transmitter device includes a radio frequency circuit configured to transmit the expected transmission to the receiver device. The transmitter device further includes a second communication device configured to establish a bi-directional wireless communication link with the first data communication device. The transmitter device yet further includes a processing system communicably connected to the radio frequency circuit and the second communication device. The processing system is configured to cause the radio frequency circuit to transmit the expected transmission to the receiver device upon receiving the signal via the bi-directional wireless data communication link.

Another embodiment relates to a system for mounting to a vehicle including a user interface element and for controlling a transmitter device configured to send an expected transmission to receiving device is provided. The system includes a transceiver and an interface for receiving a first signal from the user interface element. The system yet further includes a processor configured to establish a bi-directional data communication link between the transceiver and the transmitter device. The processor is further configured to cause the transceiver to send a second signal to the transmitter device via the bi-directional data communication link based upon the first signal received at the interface. The processor is yet further configured to format the second signal so that the transmitter device will send the expected transmission to the receiving device.

Another embodiment relates to a method for configuring a system for mounting in a vehicle to send an expected transmission to a receiver device located external the vehicle. The receiver device is configured to change states based upon the receipt of the expected transmission. The method includes receiving a user input signal at an interface for communicably coupling to a user interface element. The method further includes establishing a bi-directional wireless data communication link with the receiver device. The method yet further includes sending a request for information regarding the receiver device and/or the expected transmission via the bi-directional wireless data communication link. The method further includes receiving the information via the bi-directional wireless data communication link. The method yet further includes configuring the system for mounting in the vehicle to transmit the expected transmission upon receiving a command signal.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numbers refer to like elements, in which.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
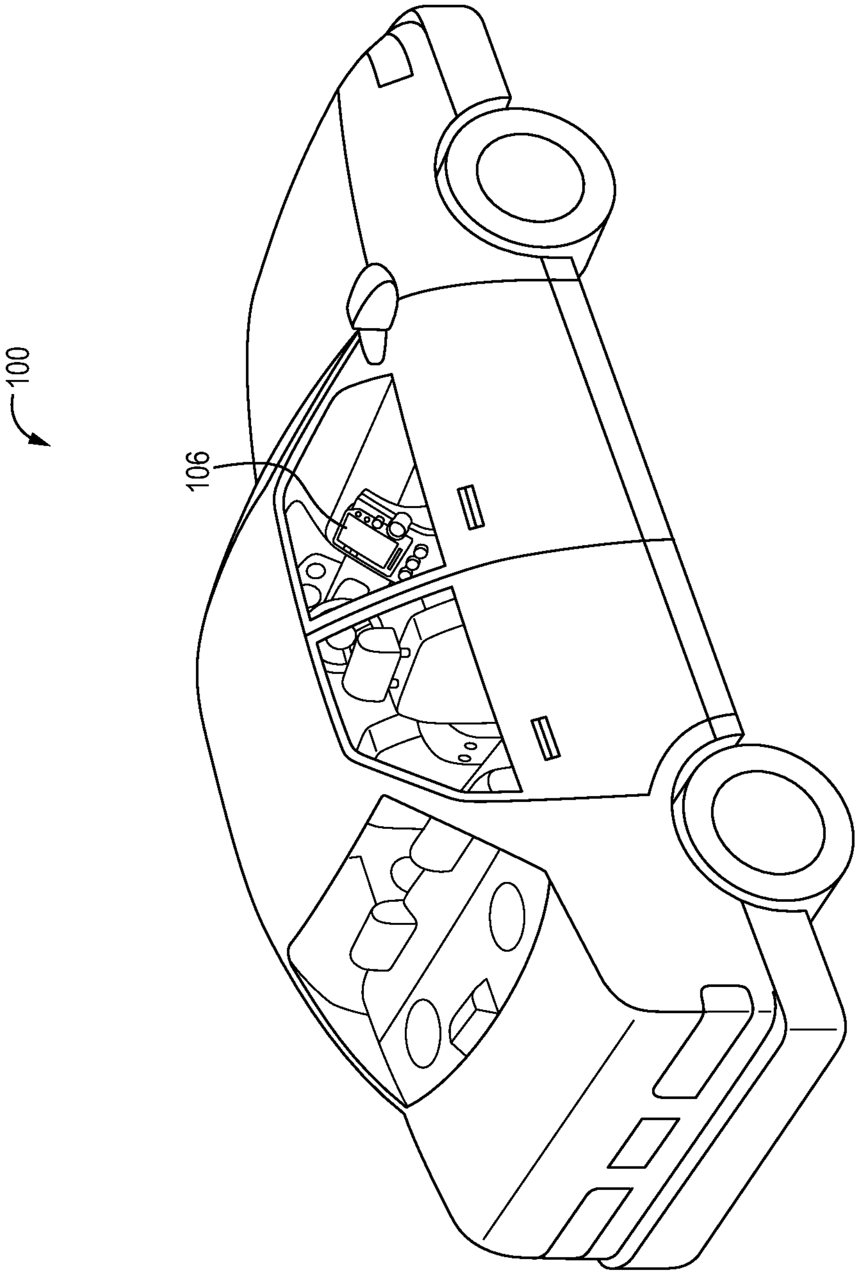
FIG. 1 is a perspective view of a motor vehicle that includes an in-vehicle control system, according to an exemplary embodiment.

Referring to FIG. 1, a vehicle 100 includes a number of subsystems for user convenience and entertainment. Vehicle 100 generally includes a heating, ventilation, and air-conditioning (HVAC) system, a sound system, and an in-vehicle control system 106 (e.g., media system, navigational system, entertainment system, display system, communications systems, etc.). The HVAC system, sound system, display systems, and communications systems may be coupled to in-vehicle control system 106, which is capable of controlling and monitoring a variety of systems, automatically or by a manual user command. It is noted that in various exemplary embodiments, vehicle 100, the HVAC system, the sound system, and other vehicle systems may be of any past, present, or future design capable of interacting with in-vehicle control system 106.

Figure 2:
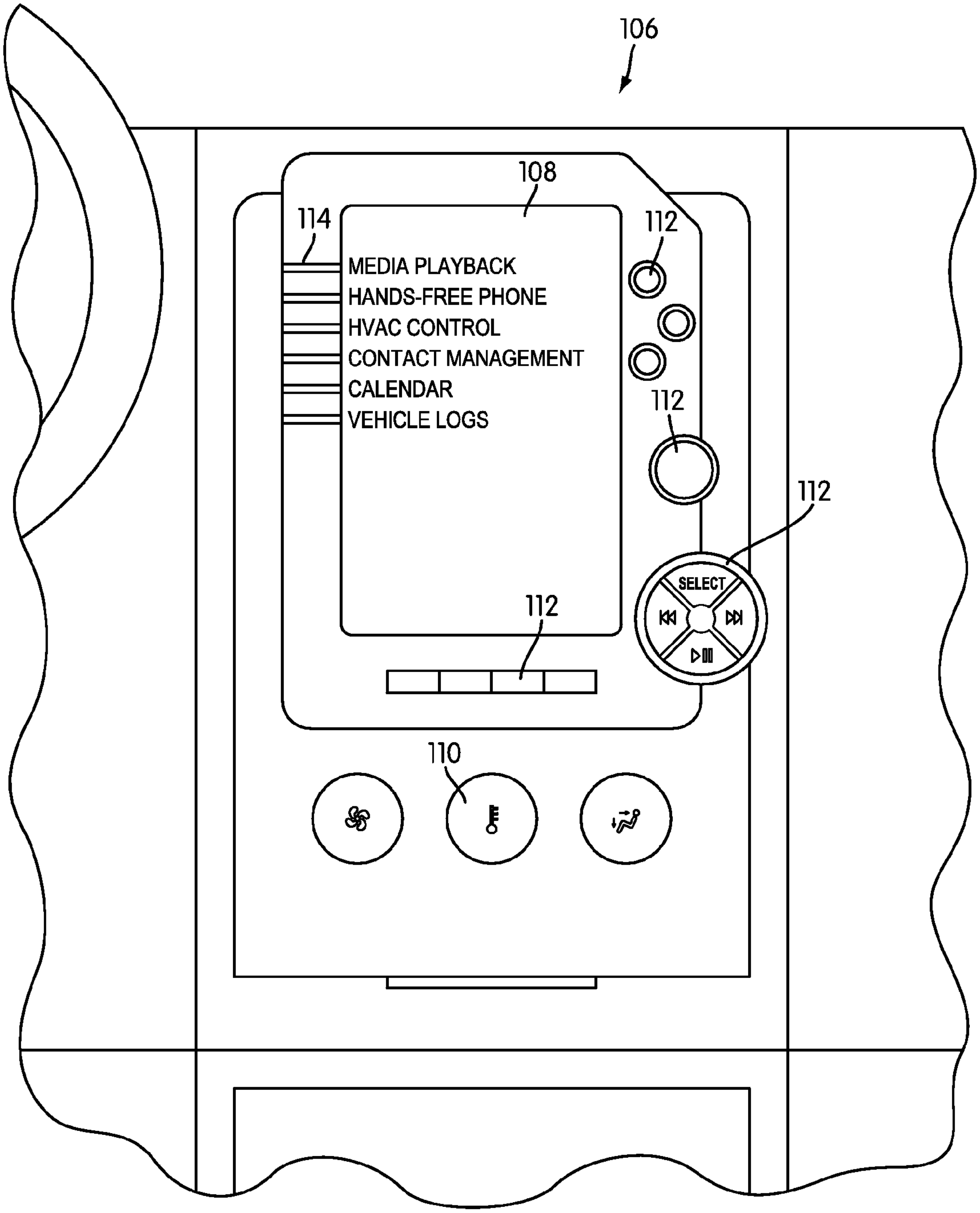
FIG. 2 is a front elevation view of the user interface of the in-vehicle control system of FIG. 1, according to an exemplary embodiment.

Referring to FIG. 2, one exemplary embodiment of in-vehicle control system 106 is shown. In-vehicle control system 106 generally includes an output display 108, one or more knobs 110, one or more pushbuttons 112, and one or more tactile user inputs or pushbuttons 114, which facilitate controlling various vehicle and media functions. In one exemplary embodiment, output display 108 may be a touch-screen display, while in other exemplary embodiments, may be any other non-touch sensitive display. In still other exemplary embodiments, output display 108 may be of any technology (e.g., LCD, DLP, plasma, CRT), configuration (e.g., portrait or landscape), or shape (e.g., polygonal, curved, curvilinear). Output display 108 may be a manufacturer installed output display, an aftermarket output display, or an output display from any source. Output display 108 may be an embedded display (e.g., a display embedded in the control system or other vehicle systems, parts or structures), a standalone display (e.g., a portable display, a display mounted on a movable arm), or a display having any other configuration. Output knobs 110 and pushbuttons 112 and 114 may be configured to control a vehicle function such as a remote control function or a communications function. Pushbuttons 114 typically allow for the selection and display of various functions of control system 106 including HVAC system control, sound system control, media system control, display system control, communications system control, transmitter device control (e.g., a transmitter for communicating with a receiver device external the vehicle), hands-free phone use, contract or address/phone book management, calendar viewing/modification, and vehicle data logging. The operations of pushbuttons 114 for communications control may display a menu screen or execute commands that allow the user to input, view, select, reset, set, pair, or activate communications settings or communications modes by tactile or oral command. The operations of pushbuttons 114 for transmitter device control may display a menu screen or execute commands that allow the user to pair a transmitter, the train a vehicle-mounted communications device, or to assign a stored transmission to a button, command, or other user interface element.

Figure 3:
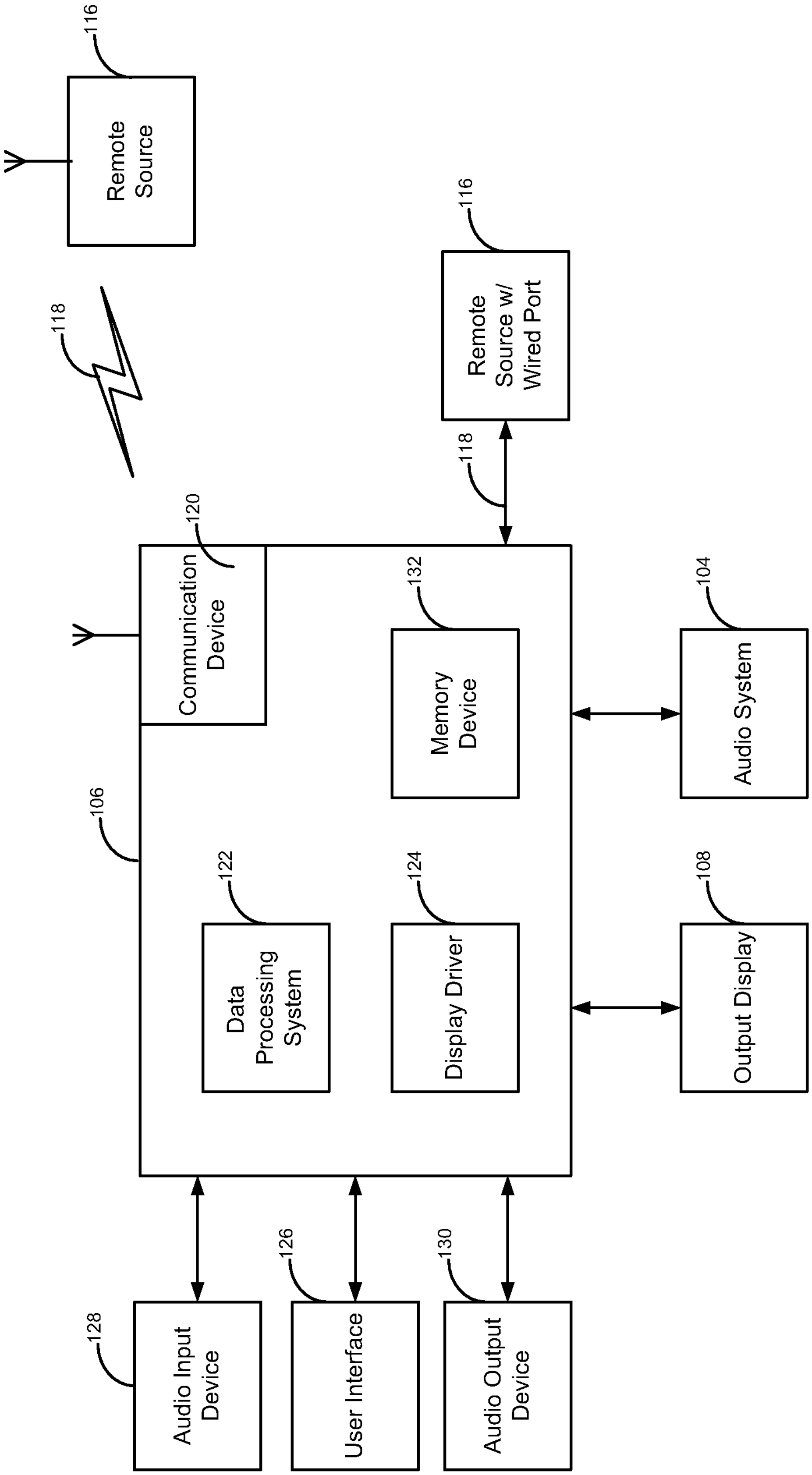
FIG. 3 is a block diagram of the in-vehicle control system of FIG. 1 that includes various components, according to an exemplary embodiment.

Referring to FIG. 3, control system 106 is capable of accessing data files or other information from a remote source 116 over a communication link 118. For example, in-vehicle control and media system 106 may access media files, phonebook data files, calendar data, or any other accessible data.

In-vehicle control system 106 may also send requests, receive files, send and receive commands, and send and/or receive any other type of data to and/or from a remote source 116 over a communications link 118.

In-vehicle control system 106 generally includes a communication device 120, a data processing system 122, a display driver 124, a user interface 126, an audio input device 128, an audio output device 130, an output display 108, and a memory device 132.

Communication device 120 is generally configured to establish a bi-directional wireless communication link 118 with remote source 116. In one exemplary embodiment, control system 106 may establish a wireless communication link such as with a Bluetooth communications protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless technology. In another exemplary embodiment, control system 106 may establish a wired communication link such as with USB technology, IEEE 1394 technology, optical technology, other serial or parallel port technology, or any other suitable wired link. Communications links may be formed such that communications device 120 may be simultaneously connected to multiple remote sources. Communication device 120 may send and receive one or more data streams, data strings, data files or other types of data to/from remote source 116. In various exemplary embodiments, the data files may include text, numeric data, audio, video, program data, command data, information data, coordinate data, image data, streaming media, or any combination thereof Data processing system 122 is coupled to communications device 120 and is generally configured to control each function of in-vehicle control and media system 106. Data processing system 122 may facilitate speech recognition capabilities of in-vehicle control system 106 for the convenience of the user. Data processing system 122 may include digital or analog processing components and/or be of any past, present, or future design that facilitates control or provides processing features to in-vehicle control system 106. Data processing system 122 may be a single data processing device or multiple data processing devices. Data processing system 122 may be a data processing device having data processing sub-devices or components. Data processing system 122 may include any combination of program software and hardware capable of providing control, display, communications, input and output features to the vehicle. Data processing system 122 may coordinate, control, and/or facilitate the various devices, components and features of the in-vehicle control system (e.g., communications device 120, output display 108, display driver 124, memory device 132, audio system 104, user interface 126, audio input device 128, audio output device 130, etc).

Display driver 124 is coupled to output display 108 and is typically configured to provide an electronic signal to the output display. In one exemplary embodiment, the electronic signal may include the text and/or numeric data of the data files, while in other exemplary embodiments, any other desired data may be included with the text and/or numeric data or by itself in the electronic signal to the output display. In another exemplary embodiment, display driver 124 may be configured to control output display 108 with touch-screen capabilities, while in other exemplary embodiments, display driver 124 may be configured to control display 108 without making use of touch-screen capabilities. Display driver 124 may include any number of functions, software or hardware, to facilitate the control and display of images on display 108. In still other exemplary embodiments, display driver 124 may be of any past, present, or future design that allows for the control of output display 108.

Audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation.

Memory device 132 is configured to store data accessed by in-vehicle control system 106. For example, memory device 132 may store data input by remote source 116, data created by data processing system 122 that may be used later, intermediate data of use in current calculation or process, or any other data of use by in-vehicle control system 106. Memory device 132 may be communicably connected to the processor and may include computer code for executing (or facilitating the execution of) the activities or processes described herein.

Figure 4:
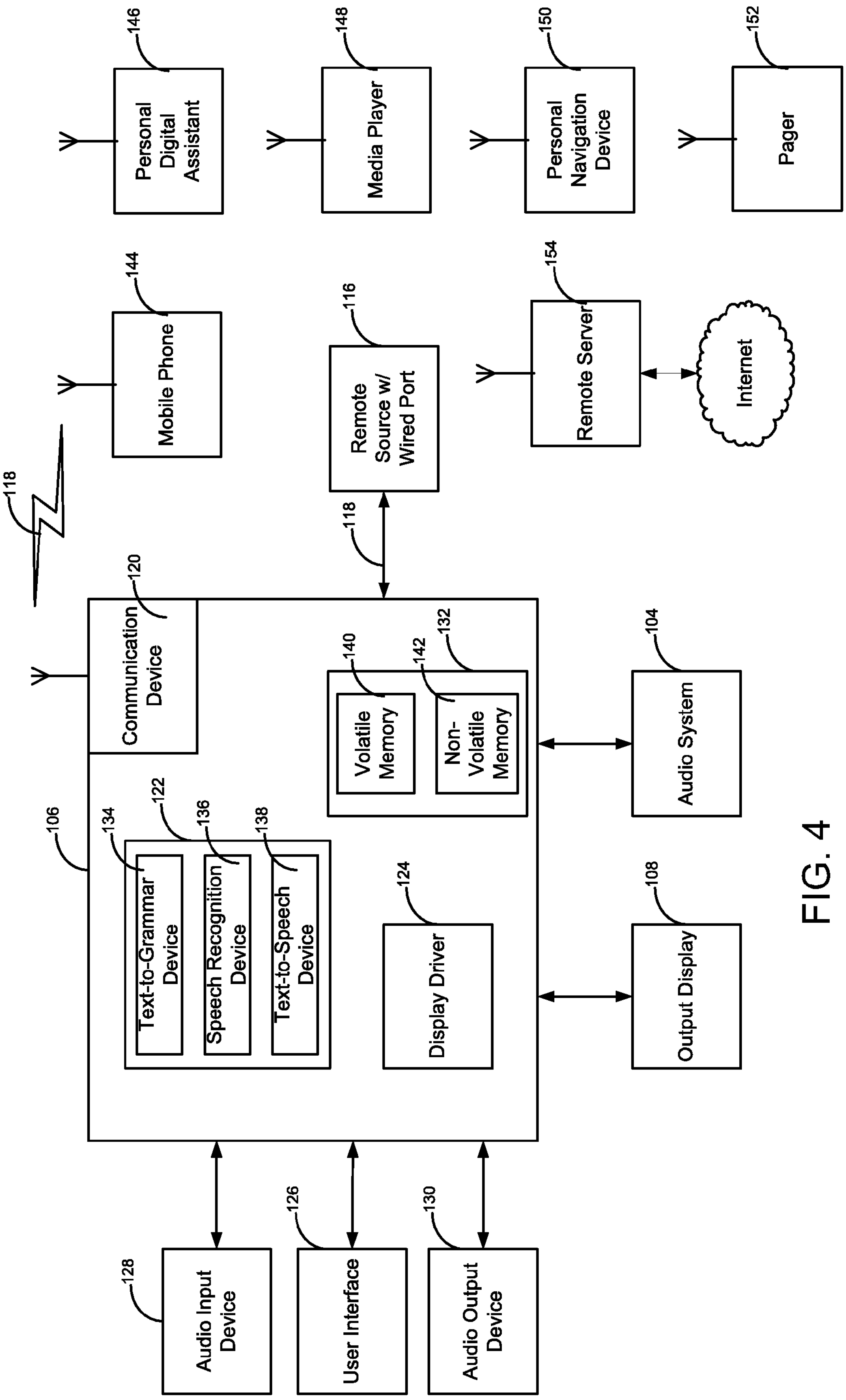
FIG. 4 is a more detailed embodiment of the in-vehicle control system of FIG. 3, according to an exemplary embodiment.

Referring to FIG. 4, in-vehicle control system 106 and remote source 116 are shown in greater detail. Data processing system 122 may generally include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 may be coupled to communications device 120 and is generally configured to generate a phonemic representation of the text and/or numeric data of each of the data files received by communications device 120 from remote source 116. The phonetic representation of the text and/or numeric data of each data file may be configured to facilitate speech recognition of each data file. After conversion of a data file to a phonetic representation, the data file may be accessed via an oral input command received by speech recognition device 136 via audio input device 128. According to an exemplary embodiment, text-to-grammar device 134 may be able to provide phonemic representations of information received from a remote source.

Speech recognition device 136 is typically configured to receive an oral input command from a user via audio input device 128. Speech recognition device compares the received oral input command to a set of predetermined input commands, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. According to an exemplary embodiment, speech recognition device 136 may be able to trigger or activate a display reproduction mode when certain commands are recognized. Furthermore, speech recognition device 136 may be able to pass commands to a remote device 116 to facilitate interactive control of a remote source via a communications link.

Text-to-speech device 138 is generally configured to convert the text and/or numeric data of each data file received from remote source 116 into an audible speech representation. This functionality may allow in-vehicle control system 106 to audibly give data to the user via audio output device 130 or the audio system 104. For example, in-vehicle control system 106 may repeat a user selected function back to the user, provide navigational information, announce directions, announce menu options, announce media file information, provide phonebook or contact information, or other information related to data stored in memory 132, remote source 116, remote server 154, etc. According to an exemplary embodiment, text-to-speech device 138 may be able to provide an audible speech representation of information received from a remote source.

Memory device 132 includes both a volatile memory 140 and a non-volatile memory 142. Volatile memory 140 may be configured so that the contents stored therein may be erased during each power cycle of the control system 106 or the vehicle 100. Non-volatile memory 142 may be configured so that the contents stored therein may be retained across power cycles, such that upon control system 106 power-up, data from previous system use remains available for the user. According to an exemplary embodiment non-volatile memory 142 may store one or more user profiles, display profiles, communications profiles, information regarding transmissions or transmission profiles for a remote control system, or any other type of user or system setting file.

According to an exemplary embodiment, remote source 116 may be any suitable remote source that includes a transceiver and is able to interface with in-vehicle control system 106 over communications link 118 (either wireless or wired). In various exemplary embodiments, remote source 116 may be one or more of a mobile phone 144, a personal digital assistant (PDA) 146, a media player 148, a personal navigation device (PND) 150, a pager 152, a remote server 154 that may be coupled to the Internet, or various other remote sources. Remote source 116 may have a storage device, one or more processing devices, and one or more communications devices. According to an exemplary embodiment, remote source 116 is a global positioning system capable remote source. According to various exemplary embodiments, remote source 116 may connect to the Internet or any other remote source with a first communications device while communicating with the control system using a second communications device.

According to an exemplary embodiment, system 106 may be used to establish a communication link with mobile phone 144 such that a mobile phone call is facilitated by the control system. For example, audio input device 128 may be a microphone configured to receive voice from an occupant of the vehicle and to provide an audio signal representing the voice to control system 106. Control system 106 may be configured to provide the audio signal to the communications device for transmission to the mobile phone (and eventually the wireless service organization). Communications device may also receive audio signals from the mobile device and provide the audio signals to an interface with a vehicle audio system.

Figure 5:
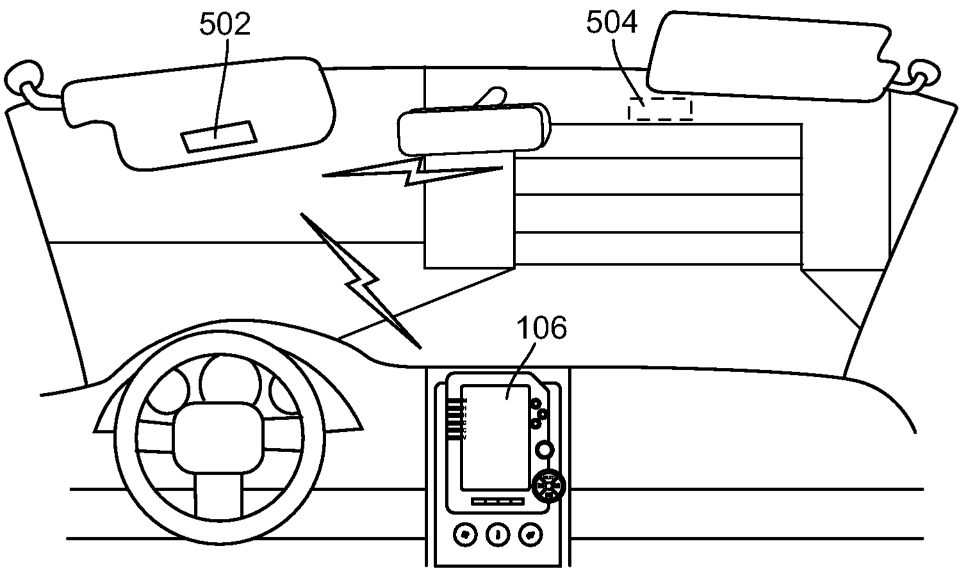
FIG. 5 is an environment view of the vehicle of FIG. 1, including an in-vehicle control system and a transmitter device, and a destination area, including a receiver device, according to an exemplary embodiment.

Referring to FIG. 5, according to an exemplary embodiment, a transmitter device 502 (e.g., remote control device, original remote control device, original transmitter, trainable remote control device, other home control device, universal transmitter, etc.) is illustrated as being installed in a vehicle. In-vehicle control system 106 is illustrated as communicating with transmitter device 502 and transmitter device 502 is illustrated as communicating with receiver device 504 (e.g., a garage door opener).

Figure 6:
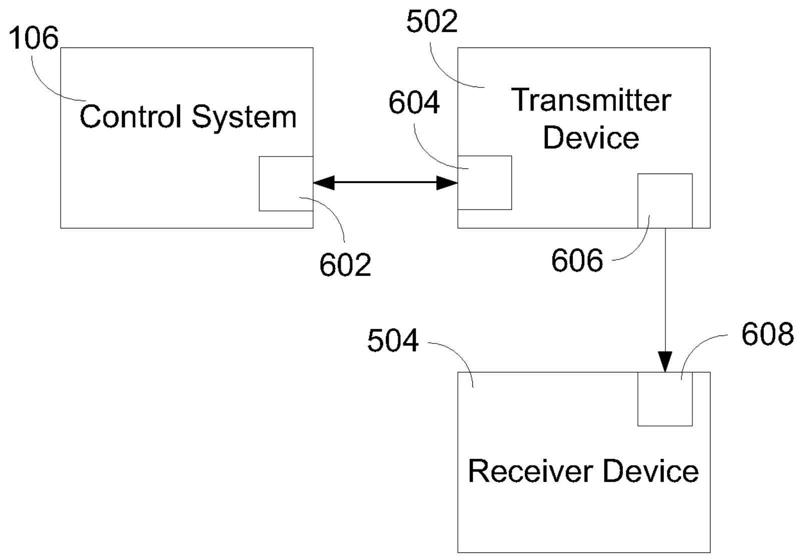
FIG. 6 is a block diagram of the in-vehicle control system, transmitter device, and receiver device of FIG. 5, according to an exemplary embodiment.

Referring to FIG. 6, according to an exemplary embodiment, control system 106 is illustrated as having a data communications device 602 (which may be communications device 120 of FIGS. 3-4 or otherwise) capable of communicating with a data communications device 604 of the transmitter device 502 (e.g., home control device, etc.). Transmitter device 502 has a transmitter 606 capable of sending an activating signal or transmission to a receiver 608 of a receiver device 504. According to an exemplary embodiment, the communications link between device 602 and 604 is a bi-directional wireless data communications link. According to an exemplary embodiment, transmitter 606 sends an RF signal to receiver 608.

Figure 7:
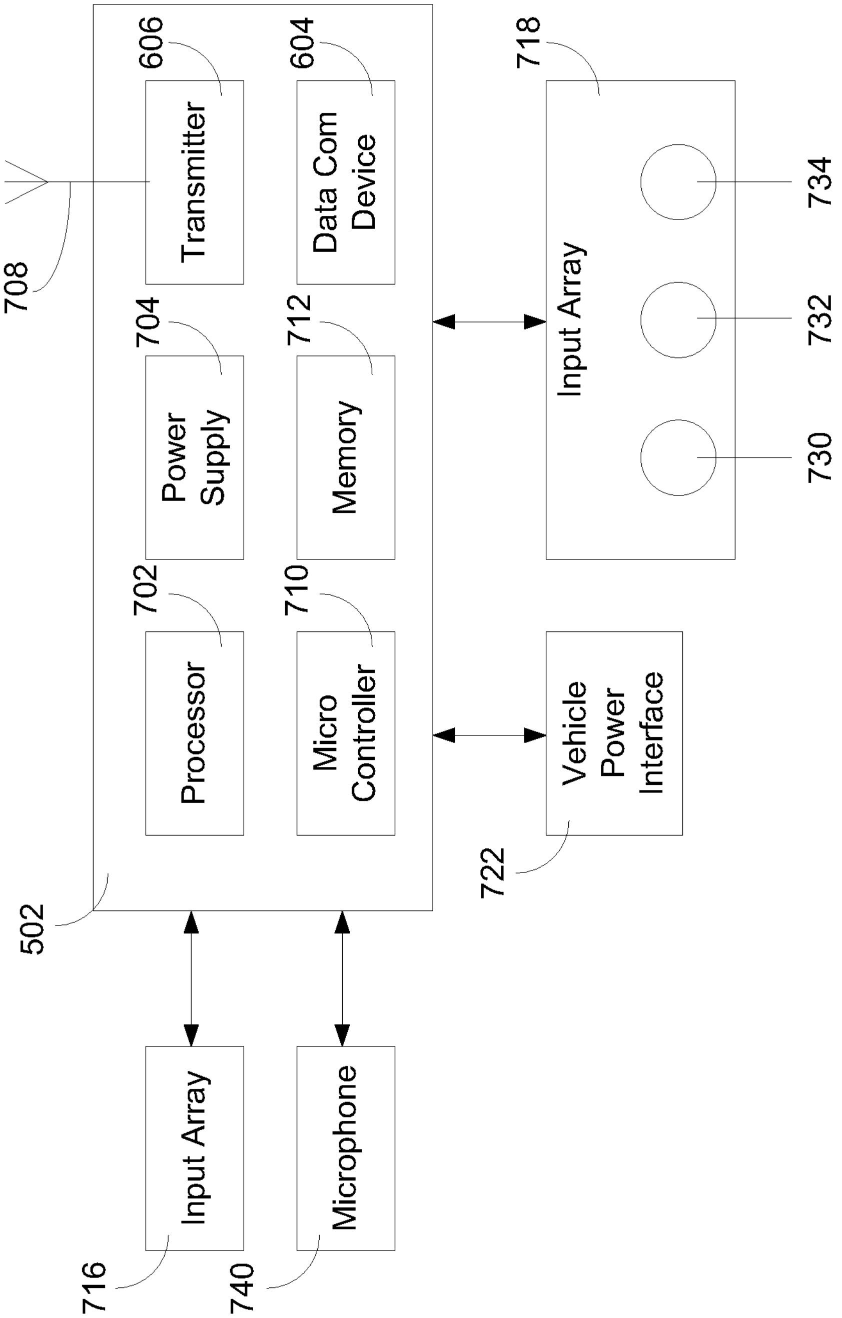
FIG. 7 is a block diagram of the transmitter device of FIG. 5, according to an exemplary embodiment.

Referring to FIG. 7, a transmitter device 502 (e.g., a remote control device) is illustrated, according to an exemplary embodiment. Transmitter device 502 may include a processor 702, a power supply 704, a transmitter 606, an antenna 708, a micro controller 710 (e.g., second processor, etc.), a memory 712 (non-volatile or volatile), a transmit circuit, a data communications device 604, input arrays 716 and 718, a vehicle power interface 722, and a microphone 740. Input arrays 716 and 718 may be interfaces with control system 106 user interface elements, arrays of buttons (e.g., buttons 730, 732, and 734), or interfaces to any other user interface elements. Processor 702, microcontroller 710, and/or other processing devices or circuits of transmitter device 502 may be any combination of hardware and software of the past, present or future capable of facilitating, controlling, and/or coordinating the operation of transmitter device 502. Antenna 708 and transmitter 606 may be configured to transmit activating signals to a receiver device, such as a garage door opener located external the vehicle. Transmitter 606 may comprise a transmitter, a receiver, a transceiver, an RF circuit, a modulator, and/or any combination of transmitter and receiver devices. Vehicle power interface 722 may be an interface wherein transmitter device 502 may be connected to vehicle power. The power supply might be a battery or other power supply capable of powering transmitter device 502. Data communications device 604 may comprise a second transmitter, receiver, transceiver, RF-circuitry, and/or any other hardware and software capable of providing or enabling data communications. According to various other exemplary embodiments, remote control device 502 may have other combinations of parts (hardware and/or software) capable of accomplishing the data communications and subsequent RF-transmissions described herein. According to an exemplary embodiment, buttons 730, 732, and/or 734 are configured to be reconfigurable or programmable.

Figure 8:
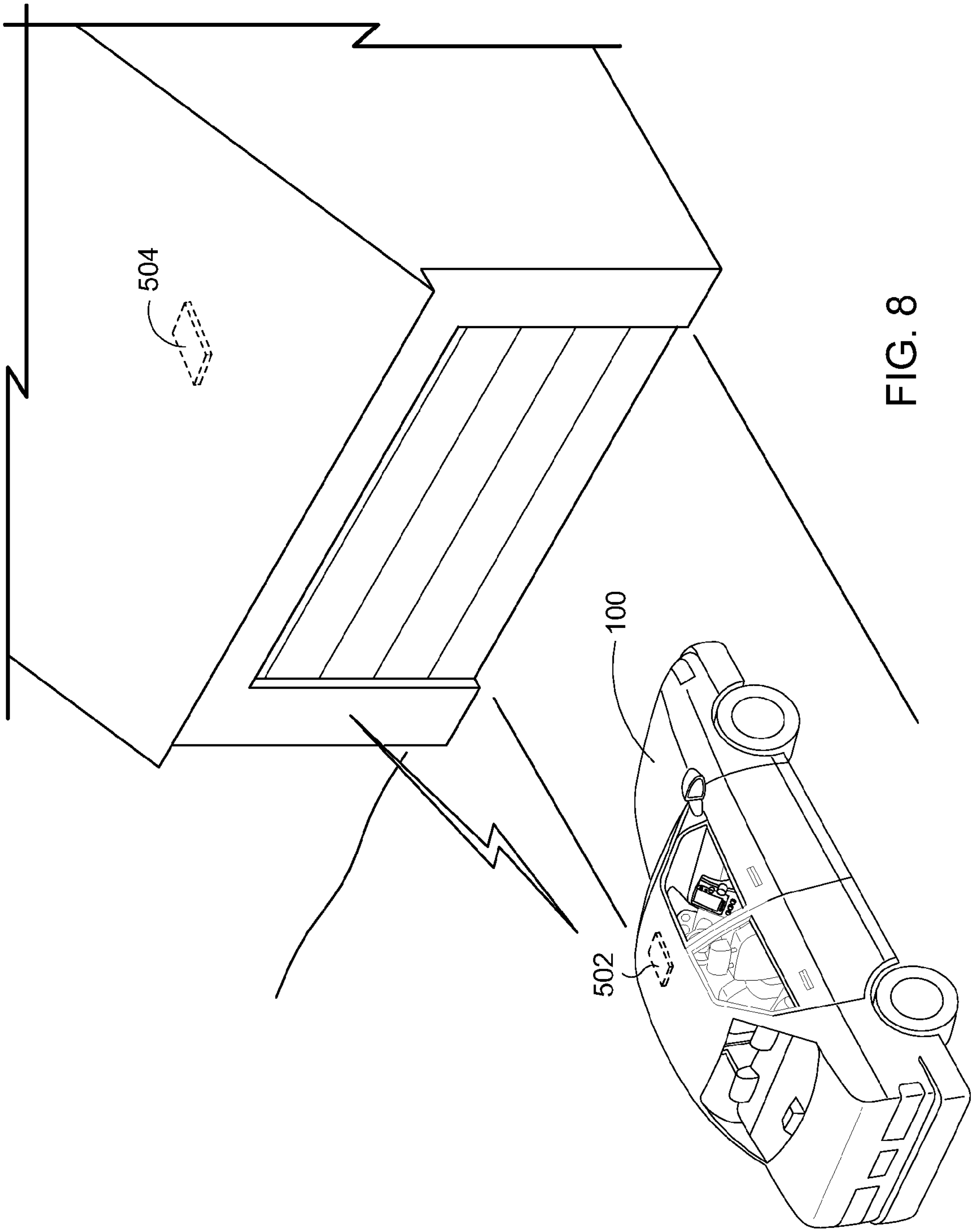
FIG. 8 is an environment view of the vehicle of FIG. 1, including a transmitter device, and a destination area, including a receiver device, according to an exemplary embodiment.

Referring to FIG. 8, a perspective view of a transmitter device 502 (e.g., home control device, universal remote control device, etc.) is illustrated as being installed in a vehicle ceiling portion (e.g., visor portion, rear-view mirror adjacent, etc.) and transmitting an activating signal or another transmission to a receiver device 504 (e.g., home device, garage door opener, etc.). If the transmission is an expected transmission or a recognizable transmission to receiver device 504, the receiver device 504 may change state (e.g., send changed control signal to a motor, change a variable to represent a "home" state, turn a light on, etc.).

Figure 9:
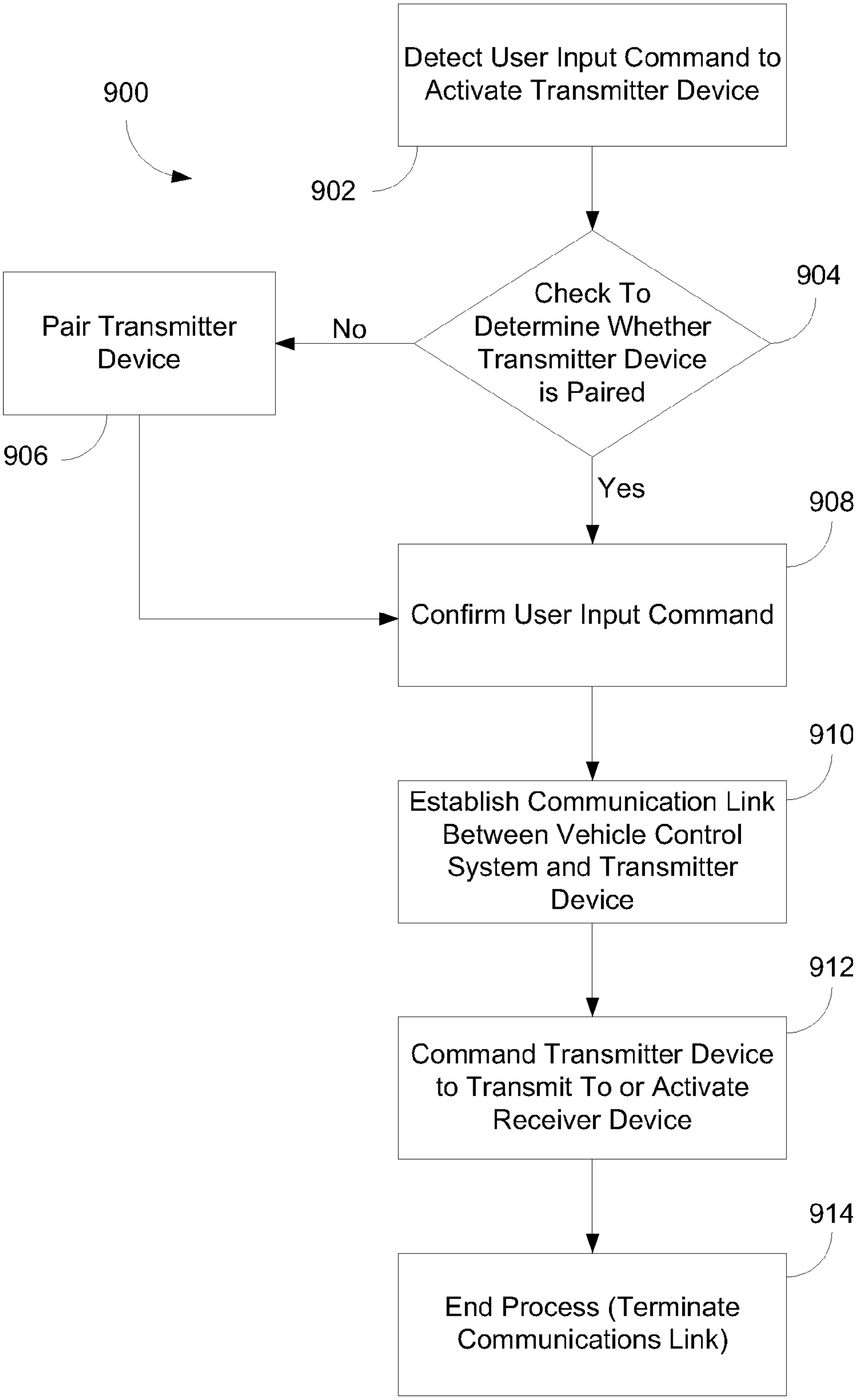
FIG. 9 is a flow diagram of a process of using a transmitter device and in-vehicle control system, according to an exemplary embodiment.

Referring to FIG. 9, a flow diagram of a process 900 of using a vehicle control system to control a transmitter device is shown, according to an exemplary embodiment. Upon receiving an input command to activate a receiver device (e.g., a garage door opener) (step 902), the vehicle control system may check to determine whether a transmitter device (e.g., a garage door remote control, etc.) has been previously "paired" or setup with the vehicle control system (step 904). If a transmitter device has not been previously paired or setup, the vehicle control system may initiate any number of processes to pair and/or setup the transmitter device with the vehicle control system's communications device (step 906).

Once a pairing or setup has been completed, or if such pairing or setup was previously completed, the user input command may be confirmed (step 908) and the vehicle control system may execute a process to establish a communication link with the transmitter device (step 910). According to an exemplary embodiment, the communications link is a bi-directional wireless data communication link. Step 910 may include any number of negotiating, authenticating, and/or initializing activities. For example, the control system (and/or the tramsmitter device) may then check to determine whether the communication link is secure to prevent unauthorized use or reception. This may include ensuring that any encryption modes are enabled and that encrypted communications are established, active, and/or working between the transmitter device and the vehicle control system. Once a communication link between the transmitter device's data communications device and the vehicle control system's data communications device has been established, the vehicle control system may command the transmitter device to transmit or otherwise activate the receiver device (step 912). Once the receiver device has been activated (state changed, opened or closed, etc.), the vehicle control system may end the process (step 914).

According to various alternative embodiments, any time a transmitter device is in-range of the in-vehicle control system a data communications link is maintained such that activation of a receiver device need not include the step of establishing a communications link. Various other embodiments terminate the communications link and may even power-down the data communications devices (or "sleep" into a low power mode) to conserve power. The steps of the process may include any number of other user interface steps and processes including additional user interface steps. According to yet other embodiments, a user interface may be minimally involved. For example, the process may be activated via a single button press. The device may search for a compatible transmitter device, conduct necessary pairing automatically, establish a communications link, and command the transmitter device to transmit to a receiver device based on the single press.

Figure 10A:
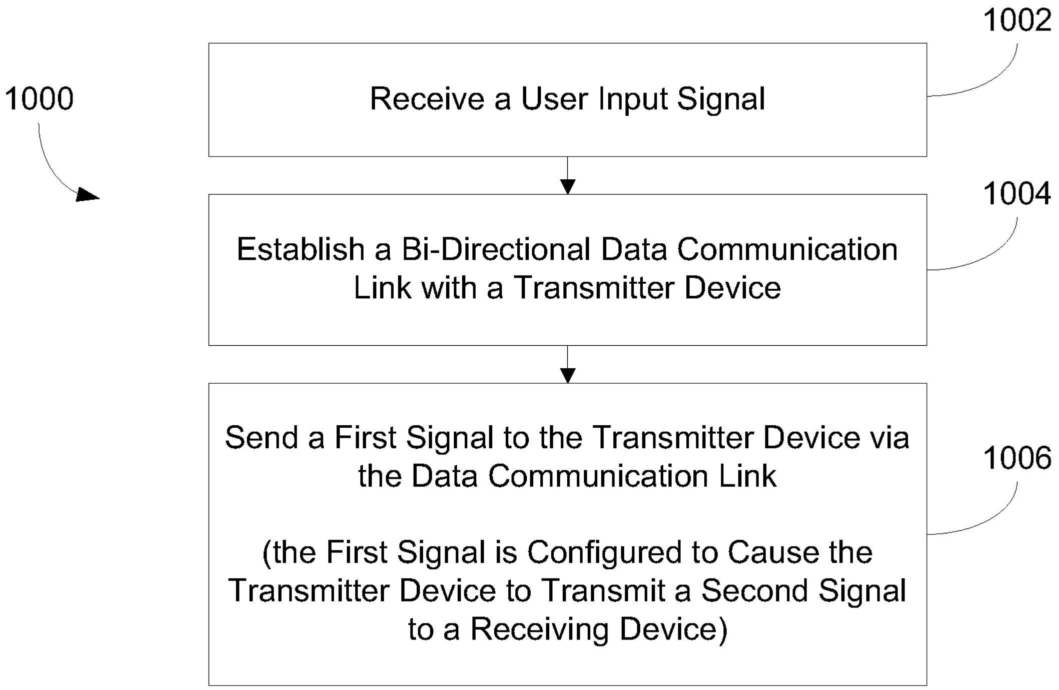
FIG. 10A is a flow diagram of a method of communicating to a transmitter device using a vehicle control system, according to an exemplary embodiment.

Referring to FIG. 10A, a flow diagram of a process 1000 of using a vehicle control system to activate a transmitter is shown, according to an exemplary embodiment. A user input signal is first received by the vehicle control system (or other system of the vehicle) (step 1002). Upon reception of the user input signal, a bi-directional wireless data communication link may be established with a transmitter device (e.g., "original" or "portable" transmitter) located within the vehicle or otherwise (step 1004). The data communications devices of the vehicle control system and the transmitter device may be capable of communicating with each other via the data communication link formed. The data communications devices may be capable of forming a wireless data communication link that allows at least command messages to be transferred from the in-vehicle control system to the transmitter device. A first signal may then be transmitted to the transmitter device via the data communication link (step 1006). The first signal may be configured to cause the transmitter device to transmit a second signal to a receiver device external of the vehicle. The signal transmitted to the receiver device may activate an electrical or mechanical device of or connected to the receiver device. For example, the signal transmitted to the receiver device may activate a garage door opener such that the garage door opener opens or closes.

Figure 10B:
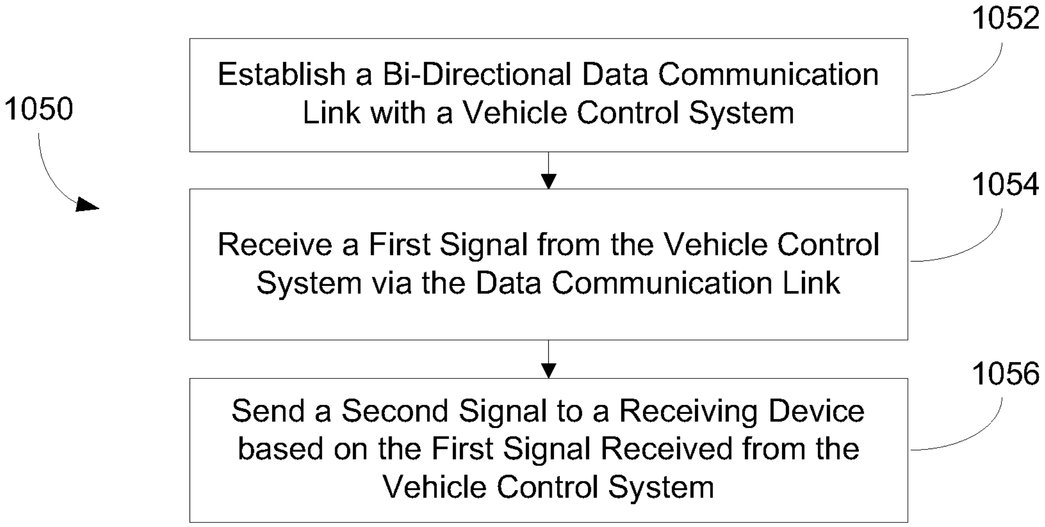
FIG. 10B is a flow diagram of a method of receiving and sending a signal using a transmitter device, according to an exemplary embodiment.

Referring to FIG. 10B, a flow diagram of a process 1050 for using a transmitter device to receive a data communication signal and to send a second signal to a receiver device is shown, according to an exemplary embodiment. A bi-directional data communication link with a vehicle control system of the vehicle may be established (step 1052), which may be similar to step 1004 of FIG. 10A. A first signal transmitted by the vehicle control system is received by the transmitter device via the data communication link (step 1054). A second signal is created based upon the first signal received by the transmitter device. The second signal is transmitted to a receiver device (step 1056).

Figure 11A:
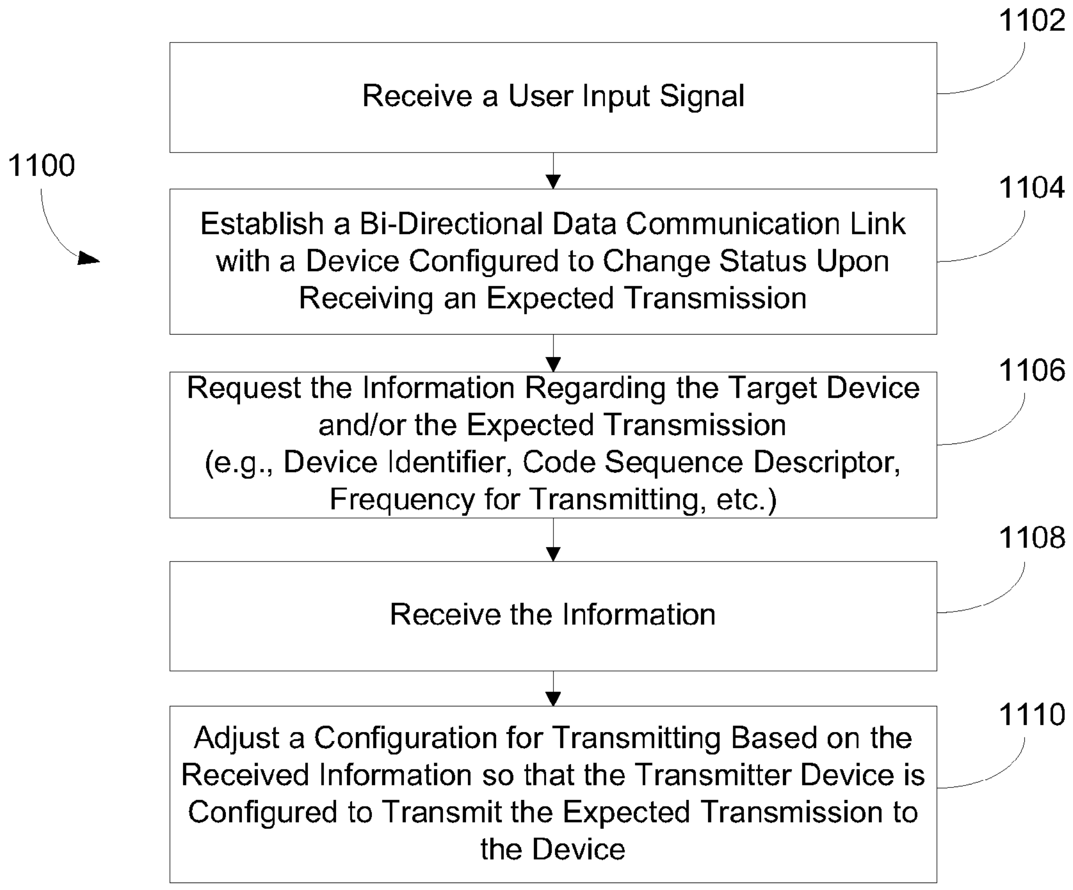
FIG. 11A is a flow diagram of a method of training a transmitter device, according to an exemplary embodiment.

Referring to FIG. 11A, a flow diagram of a process 1100 of configuring (e.g., training) a transmitter device is shown, according to an exemplary embodiment. A user input signal is first received by the transmitter device (step 1102). Once the signal is received, a bi-directional wireless data communication link may be formed with a receiver device (e.g., a garage door opener) configured to change status (e.g., to send a control signal to an actuator or motor) upon receiving an expected transmission (step 1104). An expected transmission may be any transmission that is recognizable and/or formatted for recognized reception by a receiver device.

Information may be requested via the communication link regarding the targeted receiver device and its expected transmission (step 1106). For example, an identifier of the receiver device (e.g., a device ID, a device class, a unique string, a unique address, etc.) may be sent to the transmitter device. According to various exemplary embodiments, a code sequence descriptor, a transmission frequency, or other properties may be requested by the transmitter device via the data communication link. A code sequence descriptor may specify one or more attributes regarding a code format the receiver is configured to receiver and recognize For example, a code sequence descriptor may specify whether the code type (e.g., Rolling Code, Billion Code, etc.), how many times a code must be sent, a specific sequence of codes that should be sent, a timing variable, synchronization information, etc.

The information may be received by the transmitter device (step 1108). The information may be used to adjust a configuration of the transmitter for transmitting data to the receiver device (step 1110). The resulting configuration may be used to format future transmissions such that the receiver device may receive an expected transmission from the transmitter device any time a vehicle user interface element is associated with the expected transmission is triggered. The configuring activity may be conducted in any number of ways. For example, the configuring activity may store or update some variables in a memory unit of the transmitter device. A processing device and/or a modulator may utilize the received information to configure a formula or function for formatting transmissions. The information may be sent in a variety of formats, including, for example a tagged format or markup language (e.g., a file according to the extensible markup language (XML), etc.). According to other various exemplary embodiments, a protocol may be provided for sending a stream of data (e.g., binary data), some of the bits specifying a device ID, one or more bits specifying a code type, etc. The configuration may also include synchronizing a component of the transmitter with a component of the receiver device. For example, synchronization may include synchronizing a counter on the transmitter device and/or the receiver device (e.g., the counter for rolling code activity or otherwise). Synchronization may also occur after the configuration.

Figure 11B:
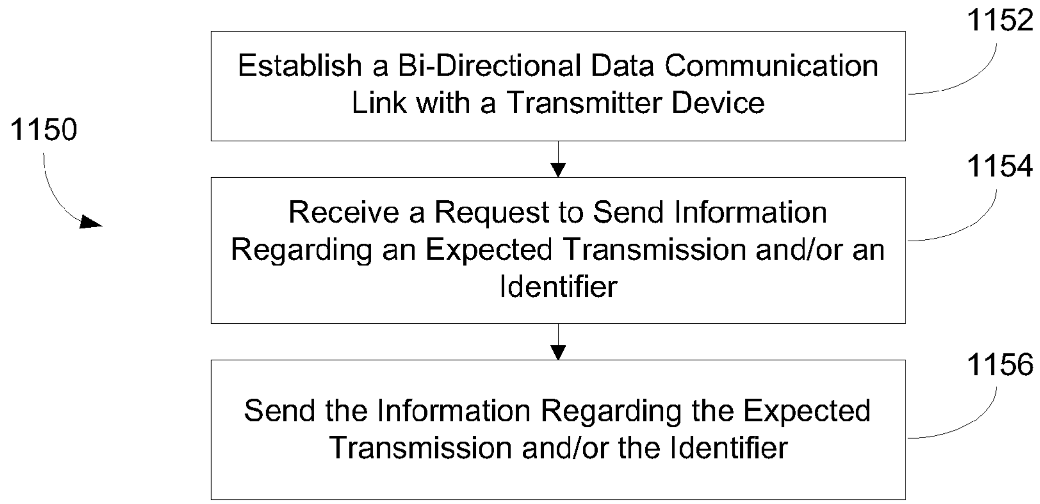
FIG. 11B is a flow diagram of a method of communicating between a transmitter device and a receiver device, according to an exemplary embodiment.

Referring to FIG. 11B, a flow diagram of a process 1150 for sending information regarding an expected transmission and/or an identifier from a receiver device to a transmitter device is shown, according to an exemplary embodiment. A bi-directional wireless communication link may be formed between a receiver device and a transmitter device (step 1152). Once the link is formed, a request to send information regarding an expected transmission, identifier, and/or other property is received by the receiver device (step 1154). The receiver device may transmit information regarding the expected transmission, identifier, and/or other property to the transmitter device (step 1156).

It is important to note that according to various exemplary embodiments, the transmitter device may be a device of a vehicle control system, a device for mounting to a vehicle, or a portable transmitter (e.g., universal transmitter, etc.).

Referring more generally to FIGS. 10A-11B, the in-vehicle control system may use any of its user interface features to initiate a communications link between the control system and the transmitter device. Similarly, the control system may use any of its user interface features to initiate or command the transmission of an activating signal from the transmitter device to a receiver device exterior of the vehicle. For example, a user of the in-vehicle control system may use voice commands, voice prompts, and/or any other voice activation to command the transmitter device to transmit activating signals to the receiver control device. A user might be able to say, for example, "open the left garage door" and this command would be recognized by speech recognition systems and/or data processing devices and software of the in-vehicle control system. Once the in-vehicle control system has recognized such a command, the in-vehicle control system may establish a data communications link (if one has not already been established) between a communications device of the in-vehicle control system and a communications device of the transmitter device. Once a communications link has been established and/or verified to exist between the in-vehicle control system and the transmitter device, the in-vehicle control system may send a command, request, or series of commands and/or requests to the transmitter device that cause the transmitter device to send a transmission to the receiver device of the left garage door, for example. The transmitter device may process the received requests or commands, determine whether they are valid and/or conduct any other security or validation steps, or conduct any number of other steps prior to causing a transmission to the receiver device. According to an exemplary embodiment, any number of activation steps could be taken by a user. For example, a user may activate a transmitter device through the in-vehicle control system and the accompanying data communication devices through a touch screen interface, through a pushbutton, through any other tactile button, through voice recognition, and/or through any other input mechanism.

According to an exemplary embodiment, the in-vehicle control system may be an in-vehicle control system located at any location within the vehicle and may be an in-vehicle control system of any complexity. For example, the in-vehicle control system of the present invention may simply comprise a single button, a single communications device, and a minimal amount of electronics circuitry to enable the control system to establish a communications link with a transmitter device. By way of further example, the in-vehicle control system having a communications device capable of communicating with the transmitter device may exist at an overhead location within the vehicle and have a limited number of devices (e.g, processor, memory, speaker, microphone, button(s), LEDs, etc.). According to an exemplary embodiment, the vehicle control system is a device configured to facilitate hands-free voice communications between a mobile phone, a microphone, and an audio output device (e.g., speaker, vehicle audio system). The transceiver used for the communications between the control system and the mobile phone may also be the transceiver used to connect the control system to the transmitter device. By way of example, the control system may be a BlueConnect® control system sold by Johnson Controls, Inc. According to various other exemplary embodiments, one or more control systems described in U.S. Pat. No. 7,257,426 may be configured to also connect to a transmitter and/or to conduct the activities variously described in the present application. The entirety of U.S. Pat. No. 7,257,426 is hereby incorporated by reference.

According to various exemplary embodiments, the transmitter device may be a factory supplied remote control device having the addition of a Bluetooth integrated microcontroller or transceiver. This configuration may reduce the need for some types of universal transmitter training by allowing any Bluetooth compatible device (e.g., a cellular phone, a mobile phone, a PDA, a media player, a computing device, a key fob, etc.) to activate the factory remote control via a Bluetooth connection. The Bluetooth transceiver of the transmitter device (and the transmitter device itself) could be enabled or activated or commanded by any input method of compatible Bluetooth-enabled devices, including Bluetooth-enabled vehicle control systems. The transmitter device could be enabled via voice command, GUI, a button press, and/or any combination or derivative thereof. According to an exemplary embodiment, the in-vehicle control system may have any number of hardware electronics and/or software features configured to step through all activities necessary to setup, pair, enable, configure, and/or otherwise use a Bluetooth enabled transmitter device. For example, the user interface of the in-vehicle control system may provide a series of graphical menus wherein a user may select a device for pairing (e.g., from a list of Bluetooth devices in-range, etc.). If a user selects the transmitter device, the in-vehicle control system may create or present any number of follow-up screens for pairing or setting up the in-vehicle control system and/or the transmitter device. These screens may include activity screens, button matching screens, communications configuration screens, security screens, naming screens, voice command screens, etc.

According to an alternative embodiment, any trainable or universal transmitter device could include a data communications device and may be the transmitter device of the present application. The transmitter device may be configured to operate with a receiver device via information transferred via a data communications link established between the transmitter device and the receiver device. Any number of structures, methods, hardware and/or software may be added to either a universal transmitter to accomplish this operation.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

It is important to note that the construction and arrangement of the control systems, transmitters, and receivers as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system, memory device, processing system, memory device, transceiver, transmitter, receiver, communications device, data processing device, remote source, remote server, etc.), the position of elements may be reversed or otherwise varied (e.g., the components of control system, home control device, etc.), and the nature or number of discrete elements or positions may be altered or varied (e.g., communications device, memory device, the components of control system, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

The invention claimed is:

1. A transmitter device for causing a garage door opener to change states after the transmitter device receives a control signal from a first data communication device configured for bi-directional wireless data communications, the garage door opener configured to change states upon receipt of an expected transmission, the transmitter device comprising:

a radio frequency circuit configured to transmit the expected transmission to the door opener;

a second data communication device configured to establish a bi-directional wireless data communication link with the first data communication device and configured to use the bi-directional wireless data communication link with the first data communication device to obtain configuration information, wherein the configuration information includes at least one of a transmission frequency or a code sequence descriptor for the expected transmission, and wherein the control signal is received via bi-directional data communication with the first data communication device;

a memory unit configured to store the configuration information received via the bi-directional wireless data communication link in the first communication session; and a processing system communicably connected to the radio frequency circuit, the memory unit, and the second data communication device, the processing system configured to automatically cause the radio frequency circuit to transmit the expected transmission to the garage door opener in response to receiving the control signal via the bi-directional wireless data communication link without further user interaction;

wherein the control signal comprises a command message and the expected transmission comprises an RF signal generated and transmitted in response to the command message, and wherein the RF signal is generated using the configuration information received via the bi-directional wireless data communication link.

2. The transmitter device of claim 1, wherein the memory unit is configured to store a second characteristic of a second expected transmission for a second receiving device, wherein the processing system is further configured to determine which of the expected transmission for the receiving device and the second expected transmission for the second receiving device to transmit via the radio frequency circuit based on the command message.

3. The transmitter device of claim 1, wherein the processing system is further configured to cause the second data communication device to maintain the bi-directional wireless data communication link with the first data communication device after the radio frequency circuit transmits the expected transmission.

4. The transmitter device of claim 1, wherein the command message of the control signal received via the bi-directional wireless data communication link is generated in response to a selection of a touch-screen display of the first data communication device.

5. A system for mounting to a vehicle including a user interface element and for controlling a transmitter device configured to send an expected transmission to a garage door opener, the system comprising:

a transceiver;

an interface for receiving a first signal from the user interface element; and a processor configured to establish a bi-directional data communication link between the transceiver and the transmitter device, wherein the processor is configured to provide the transmitter device with configuration information via the bi-directional data communication link, wherein the configuration information is stored in a memory of the transmitter device, and wherein the configuration information includes at least one of a transmission frequency or a code sequence descriptor for the expected transmission;

wherein the processor is further configured to cause the transceiver to send a second signal to the transmitter device via the bi-directional data communication link in response to receiving the first signal at the interface;

wherein the processor is configured to format the second signal so that the transmitter device will automatically send the expected transmission to the garage door opener without further user interaction, and wherein the expected transmission is generated using the configuration information received via the bi-directional data communication link.

6. The system of claim 5, wherein the user interface element is a push button.

7. The system of claim 5, wherein the user interface element is a touch-screen display.

8. The system of claim 5, wherein the user interface element is an audio input device.

9. The system of claim 5, wherein the processor is further configured to determine if the transceiver and the transmitter device have been paired.

10. The system of claim 5, wherein the processor is further configured to terminate the bi-directional data communication link between the transceiver and the transmitter device.

11. The system of claim 5, wherein the processor is further configured to enable an encryption mode for encrypting communications via the bi-directional data communication link between the transceiver and the transmitter device.

12. A method for configuring a system for mounting in a vehicle to send an expected transmission to a garage door opener located externally the vehicle, the garage door opener configured to change states based upon the receipt of the expected transmission, the system including a transmitter device and a vehicle control system, the method comprising:

receiving a user input signal at an interface of the vehicle control system;

establishing a bi-directional wireless data communication link between the vehicle control system and the transmitter device of the system in response to the user input signal received at the interface of the vehicle control system;

sending a request for configuration information from the transmitter device to the vehicle control system regarding the garage door opener or the expected transmission via the bi-directional wireless data communication link established between the vehicle control system and the transmitter device, wherein the configuration information includes at least one of a transmission frequency or a code sequence descriptor for the expected transmission;

receiving the configuration information via the bi-directional wireless data communication link between the vehicle control system and the transmitter device;

storing the configuration information in a memory of the transmitter device; and configuring the transmitter device of the system to transmit the expected transmission to the garage door opener in response to receiving a command signal from the vehicle control system without further user interaction, wherein the expected transmission is generated using the configuration information received from the vehicle control system via the bi-directional communication link.

13. The method of claim 12, wherein the configuration information includes one of a device identifier, a code sequence descriptor, and a frequency for transmitting.

14. The method of claim 12, further comprising:

retrieving data for configuring the system to transmit the expected transmission upon demand from a memory unit of the system.

15. The method of claim 12, wherein the configuration information comprises a device identifier, a code sequence descriptor, and a frequency for transmitting.

16. The method of claim 15, further comprising:

storing the configuration information in a memory device.

17. The method of claim 16, wherein the configuring step comprises:

processing the configuration information stored in the memory device to configure a routine for generating the expected transmission.

18. The method of claim 12, further comprising automatically synchronizing a component of the system with a component of the receiving device after the configuring step.

19. The method of claim 12 further comprising:

establishing a second bi-directional wireless data communication link between the vehicle control system and the receiver device based on the user input signal.

20. The method of claim 12, wherein the command signal from the vehicle control system is generated in response to a speech input.

* * * * *